United States Patent [19]
Jin et al.

[11] Patent Number: 5,502,969
[45] Date of Patent: Apr. 2, 1996

[54] CRYOGENIC RECTIFICATION SYSTEM FOR FLUORINE COMPOUND RECOVERY

[75] Inventors: Yijian Jin, Tonawanda; Theodore F. Fisher, Amherst, both of N.Y.

[73] Assignee: Praxair Technology, Inc., Danbury, Conn.

[21] Appl. No.: 389,602

[22] Filed: Feb. 16, 1995

[51] Int. Cl.⁶ ......................................................... F25J 3/00
[52] U.S. Cl. ......................................... 62/11; 62/20; 62/28
[58] Field of Search ................................ 62/11, 12, 18, 62/20, 24, 28

[56] References Cited

U.S. PATENT DOCUMENTS

| | | | |
|---|---|---|---|
| 3,998,180 | 12/1976 | Hawkins et al. | 118/5 |
| 4,038,332 | 7/1977 | Carter | 62/20 X |
| 4,081,574 | 3/1978 | Hawkins et al. | 427/237 |
| 4,162,272 | 7/1979 | Vautrain | 62/28 X |
| 4,274,851 | 6/1981 | Stokes | 62/40 |
| 4,299,606 | 11/1981 | Robota et al. | 62/28 |
| 4,380,532 | 4/1983 | Mazurin et al. | 62/18 X |
| 4,484,954 | 11/1984 | Tarancon | 148/6.3 |
| 4,975,259 | 12/1990 | Hyakutake et al. | 62/11 X |
| 5,283,035 | 2/1994 | Karthaus et al. | 62/11 X |
| 5,367,881 | 11/1994 | Henzler | 62/11 |

Primary Examiner—Christopher Kilner
Attorney, Agent, or Firm—Stanley Ktorides

[57] ABSTRACT

A cryogenic system for the recovery of fluorine compounds from a carrier gas stream such as an effluent stream from a semiconductor facility comprising a mass transfer contacting device, such as a cryogenic wash column, integrated with a cryogenic rectification column system.

22 Claims, 5 Drawing Sheets

CRYOGENIC RECTIFICATION SYSTEM FOR FLUORINE COMPOUND RECOVERY

TECHNICAL FIELD

This invention relates to the separation and recovery of fluorine compounds from a fluorine compound-containing stream. It is particularly useful for recovering fluorine compounds from an effluent of a semiconductor production facility.

BACKGROUND ART

Fluorine compounds are used in many manufacturing processes. In particular, they are widely used in the manufacture of semiconductors. Fluorine compounds are among the more costly of the more commonly used chemicals in manufacturing processes and, moreover, are among the more environmentally detrimental of such chemicals. Accordingly there is a need for recovering fluorine compounds used in manufacturing processes so that they not cause environmental problems and also so that they may be reused.

One method currently used by industry for ensuring that fluorine compounds are not released to the environment involves combustion of the fluorine compounds contained in an effluent stream. While this method effectively destroys the fluorine compounds thus preventing environmental pollution, it also makes it impossible to reuse the fluorine compounds. This method is also disadvantageous because it generates waste gases such as hydrogen fluoride and nitrogen oxides which require further treatment. Furthermore, combustion processes require fuel and oxidant to operate, adding further operating and capital costs to the manufacturing operation.

Another method currently used by industry for the recovery of fluorine compounds is adsorption wherein the fluorine compounds are adsorbed onto adsorbent under elevated pressure and desorbed from the adsorbent under vacuum. This method is disadvantageous because very high power consumption is needed to carry out the requisite pressurization and depressurization. Moreover, the fluorine compound mixture from the desorption generally requires further purification before the components of the mixture can be reused. Still further, adsorption processes do not have the flexibility to deal with the dramatic changes in fluorine compound concentrations and flow rates which characterize manufacturing effluent streams such as those from a semiconductor manufacturing plant.

Accordingly it is an object of this invention to provide an improved fluorine compound recovery system.

It is another object of this invention to provide an improved fluorine compound recovery system which does not generate significant amounts of waste gas.

It is a further object of this invention to provide a fluorine compound recovery system which can produce fluorine compound product without need for significant further separation or purification for reuse.

It is yet another object of this invention to provide a fluorine compound recovery system which can operate effectively in spite of large changes in fluorine compound concentrations and flow rates in the stream to be treated.

SUMMARY OF THE INVENTION

The above and other objects which will become apparent to those skilled in the art upon a reading of this disclosure are attained by the present invention one aspect of which is:

A method for recovering fluorine compounds comprising:

(A) passing gaseous feed comprising carrier gas and fluorine compounds into a mass transfer contacting device, and passing wash liquid into the mass transfer contacting device;

(B) passing fluorine compounds into the wash liquid within the mass transfer contacting device to produce vapor comprising carrier gas and fluorine compound-containing wash liquid;

(C) passing the fluorine compound-containing wash liquid into a rectification column as column feed and separating the column feed within said rectification column by cryogenic rectification into fluorine compound-containing top vapor and bottom wash liquid; and (D) withdrawing fluorine compound-containing top vapor from the rectification column and recovering at least a portion thereof as product fluorine compounds.

Another aspect of the invention is:

Apparatus for the recovery of fluorine compounds comprising:

(A) a mass transfer contacting device and means for passing fluorine compound-containing feed into the mass transfer contacting device;

(B) means for passing wash liquid into the mass transfer contacting device;

(C) a rectification column and means for passing liquid from the mass transfer contacting device into the rectification column; and (D) means for recovering fluorine compounds taken from the upper portion of the rectification column.

Yet another aspect of the invention is:

A method for recovering fluorine compounds comprising:

(A) passing gaseous feed comprising carrier gas, high volatility fluorine compounds and low volatility fluorine compounds into a mass transfer contacting device, and passing wash liquid into the mass transfer contacting device;

(B) passing high volatility fluorine compounds and low volatility fluorine compounds into the wash liquid within the mass transfer contacting device to produce vapor comprising carrier gas and wash liquid comprising high volatility and low volatility fluorine compounds;

(C) passing the wash liquid comprising high volatility and low volatility fluorine compounds into a first rectification column as first column feed and separating the first column feed within said first rectification column by cryogenic rectification into top vapor comprising high volatility fluorine compounds and wash liquid comprising low volatility fluorine compounds;

(D) withdrawing top vapor comprising high volatility fluorine compounds from the first rectification column and recovering at least a portion thereof as product fluorine compounds;

(E) passing wash liquid comprising low volatility fluorine compounds into a second rectification column as second column feed and separating the second column feed within said second rectification column by cryogenic rectification into top vapor comprising low volatility fluorine compounds and residual wash liquid; and (F) withdrawing top vapor comprising low volatility fluorine compounds from the second rectification column and recovering at least a portion thereof as product fluorine compounds.

A further aspect of the invention is:

Apparatus for the recovery of fluorine compounds comprising:

(A) a mass transfer contacting device and means for passing fluorine compound-containing feed into the mass transfer contacting device;

(B) means for passing wash liquid into the mass transfer contacting device;

(C) a first rectification column and means for passing liquid from the mass transfer contacting device into the first rectification column;

(D) means for recovering fluorine compounds taken from the upper portion of the first rectification column;

(E) a second rectification column and means for passing liquid from the lower portion of the first rectification column into the second rectification column; and (F) means for recovering fluorine compounds taken from the upper portion of the second rectification column.

As used herein the term "fluorine compounds" means one or more compounds comprising fluorine.

As used herein the term "high volatility fluorine compounds" means one or more fluorine compounds having a normal, atmospheric pressure, boiling point below 150° K. Examples include carbon tetrafluoride ($CF_4$) and nitrogen trifluoride ($NF_3$).

As used herein the term "low volatility fluorine compounds" means one or more fluorine compounds which are not high volatility fluorine compounds. Examples include hexafluoroethane ($C_2F_6$), fluoroform ($CHF_3$), methyl fluoride ($CH_3F$), pentafluoroethane ($C_2HF_5$) and sulfur hexafluoride ($SF_6$).

As used herein the term "wash column" means a trayed or packed column in which a gas mixture is contacted with a liquid for the purpose of preferentially dissolving one or more components of the gas to provide a solution of them in the liquid. The operation is also known as gas absorption.

As used herein, the term "rectification column" means a distillation or fractionation column or zone, i.e., a contacting column or zone wherein liquid and vapor phases are countercurrently contacted to effect separation of a fluid mixture, as for example, by contacting of the vapor and liquid phases on a series of vertically spaced trays or plates mounted within the column and/or on packing elements such as structured or random packing. For a further discussion of rectification columns, see the Chemical Engineer's Handbook fifth edition, edited by R. H. Perry and C. H. Chilton, McGraw-Hill Book Company, New York, Section 13, *The Continuous Distillation Process*.

Vapor and liquid contacting separation processes depend on the difference in vapor pressures for the components. The high vapor pressure (or more volatile or low boiling) component will tend to concentrate in the vapor phase whereas the low vapor pressure (or less volatile or high boiling) component will tend to concentrate in the liquid phase. Partial condensation is the separation process whereby cooling of a vapor mixture can be used to concentrate the volatile component(s) in the vapor phase and thereby the less volatile component(s) in the liquid phase. Rectification, or continuous distillation, is the separation process that combines successive partial vaporizations and condensations as obtained by a countercurrent treatment of the vapor and liquid phases. The countercurrent contacting of the vapor and liquid phases is generally adiabatic and can include integral (stagewise) or differential (continuous) contact between the phases. Separation process arrangements that utilize the principles of rectification to separate mixtures are often interchangeably termed rectification columns, distillation columns, or fractionation columns. Cryogenic rectification is a rectification process carried out, at least in part, at temperatures at or below 150 degrees Kelvin (K).

As used herein, the term "indirect heat exchange" means the bringing of two fluid streams into heat exchange relation without any physical contact or intermixing of the fluids with each other.

As used herein the term "recovery as product" means removal from the system. Preferably fluorine compounds recovered by the practice of this invention are reused, either directly or after further processing.

As used herein the terms "upper portion" and "lower portion" of a column mean those sections of a column respectively above and below the midpoint of the column.

As used herein the term "dephlegmator" means a heat exchanger and a mass transfer device which is designed to operate with countercurrent flow of vapor and liquid within the passages of one or more streams. This results in mass transfer between the phases, which are removed from opposite ends of the exchanger, resulting in a separation of components.

DETAILED DESCRIPTION

The invention will be described in detail with reference to the drawings.

Figure 1:
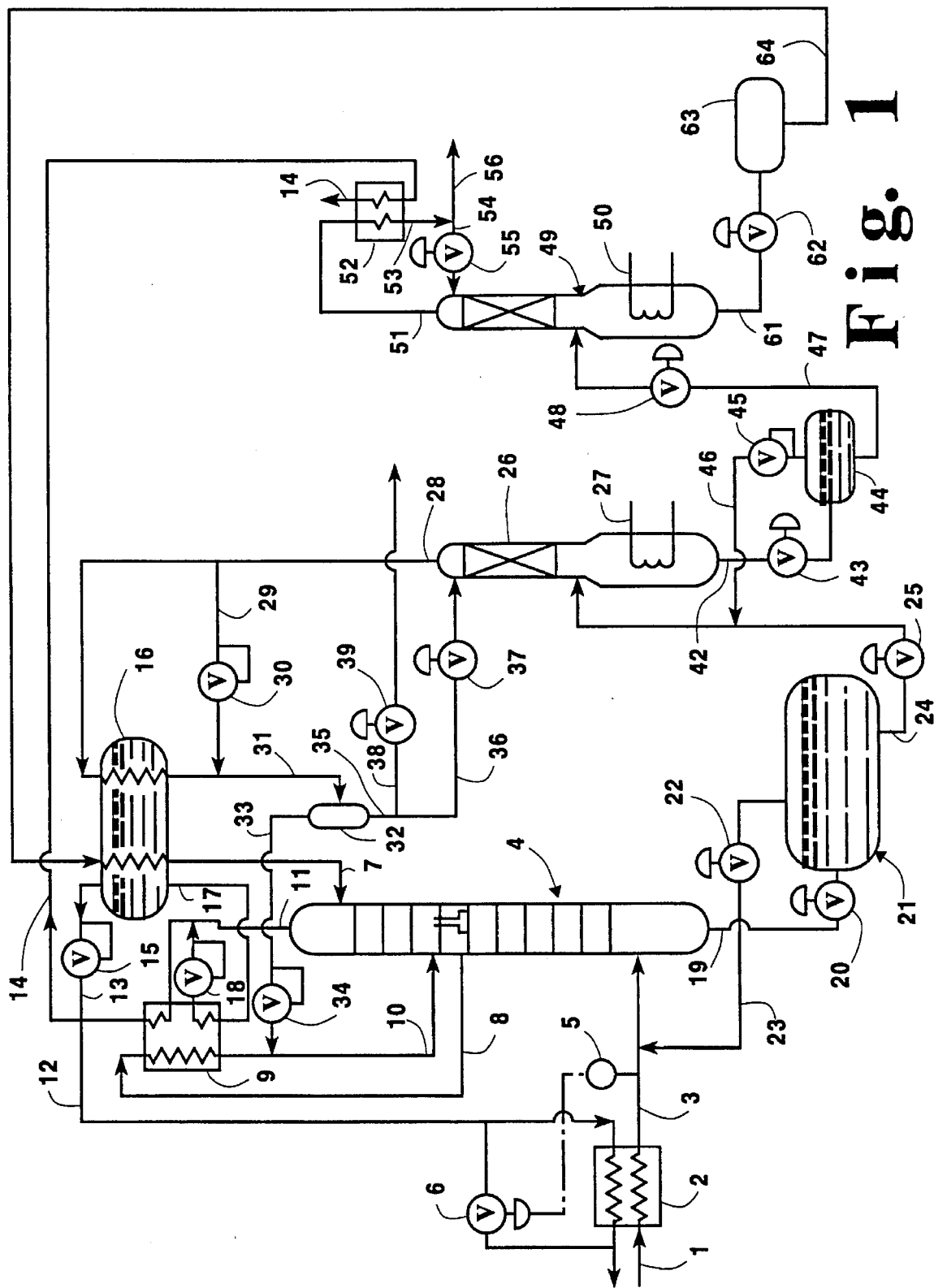
FIG. 1 is a schematic flow diagram of a preferred embodiment of the fluorine compound recovery system of this invention wherein a wash column is employed as the mass transfer contacting device.

FIG. 1 illustrates an embodiment of the invention wherein the mass transfer contacting device is a wash column. Referring now to FIG. 1, gaseous feed 1 which has been pressurized to a pressure of at least 18 and preferably at least 20 pounds per square inch absolute (psia) and has been treated to remove particulate and chemically active impurities such as hydrogen fluoride, carbon dioxide and water, and which comprises nitrogen carrier gas, high volatility fluorine compounds and low volatility fluorine compounds, is cooled by indirect heat exchange in heat exchanger 2 with return nitrogen-containing top vapor taken from the wash column to a temperature somewhat above that at which some of the fluorine compounds would begin to condense, either as solid or liquid. Generally such temperature is within to range of from 150° to 130° K. The carrier gas of the gaseous feed may comprise other gases in addition to or in place of nitrogen such as oxygen, argon, helium and/or hydrogen.

Cooled gaseous feed 3 is then passed into the lower portion of wash column 4. Temperature controller 5 controls valve 6 to ensure that the temperature of gaseous feed 3 is within the desired range. Wash liquid 7 is passed into the upper portion of wash column 4. Wash liquid 7 has a freezing point lower than the temperature of the gaseous feed as it enters the mass transfer contacting device such as wash column 4 and has a vapor pressure at that temperature less than 1.0 mmHg and preferably less than 0.01 mmHg. A preferred wash liquid is perfluoropropane ($C_3F_8$). Other fluids which may be used as wash liquid 7 include propane, ethane and mixtures thereof.

The gaseous feed flows up wash column 7 and the wash liquid flows down wash column 7 and in the process high volatility fluorine compounds and low volatility fluorine compounds pass from the gaseous feed into the downflowing wash liquid to produce nitrogen-containing top vapor and wash liquid comprising high volatility and low volatility fluorine compounds. In the embodiment illustrated in FIG. 1 upflowing gas, which has been partially depleted of fluorine compounds, is withdrawn from wash column 7 as stream 8 and cooled by indirect heat exchange in heat exchanger 9. Resulting cooled stream 10, which may contain some liquid, is passed into wash column 7. The gas then continues up the wash column in countercurrent contact with the descending wash liquid to continue carrying out the aforesaid mass transfer of the fluorine compounds into the wash liquid.

The nitrogen-containing vapor is withdrawn from the upper portion of wash column 7 as stream 11. Liquid cryogen such as nitrogen stream 17 is withdrawn from tank 16, passed through part of heat exchanger 9, through valve 18, and then combined with stream 11. The resultant stream is then passed through a portion of heat exchanger 9, and then combined with nitrogen vapor stream 13 which is supplied from tank 16 through valve 15. The combined stream is divided into streams 12 and 14. Stream 12 is passed, at least in part, through heat exchanger 2 to carry out the aforementioned cooling of gaseous feed 1 and is then passed out of the system. Stream 14 is employed in a downstream portion of the system as will be described later.

Wash liquid comprising high volatility and low volatility fluorine compounds is withdrawn from the lower portion of wash column 4 as stream 19 and preferably passed through valve 20 into first batch storage tank 21 where it is stored for subsequent batch-wise processing. The use of tank 21 is advantageous when there is a significant variance in the fluorine compound concentration in the gaseous feed and/or in the gaseous feed flow rate. Any liquid that is vaporized within tank 21 may be passed out from tank 21 through valve 22 in line 23 and combined with gaseous feed stream 3 and then into wash column 4. Wash liquid comprising high volatility and low volatility fluorine compounds is passed from tank 21 in stream 24 through valve 25 as first column feed into the lower portion of first rectification column 26 which is driven by external heat input through heat input line 27.

The rectification steps may be operated in a batch mode. Within first rectification column 26 the first column feed is separated by cryogenic rectification into top vapor comprising high volatility fluorine compounds and wash liquid comprising low volatility fluorine compounds. It will be recognized by those skilled in the art that the top vapor from column 26 may initially contain some carrier gas which has been dissolved in stream 24, and may also contain some low volatility fluorine compounds. Similarly, the wash liquid from column 26 may contain some high volatility fluorine compounds.

Top vapor comprising high volatility fluorine compounds is withdrawn from the upper portion of first rectification column 26 as stream 28 and at least a portion thereof is recovered as product fluorine compounds. In the embodiment illustrated in FIG. 1, stream 28 is passed through tank 16 in indirect heat exchange with the liquid within tank 16 and is partially condensed. A portion 29 of stream 28 may be passed through valve 30 so as to bypass tank 16. Resulting partially condensed stream 31 is then passed into phase separator 32. Vapor, comprised primarily of carrier gas, is passed out from phase separator 32 in stream 33, through valve 34 and combined with stream 10 and then into wash column 4. Liquid is withdrawn from phase separator 32 as stream 35. A portion 36 of stream 35 is passed through valve 37 and into the upper portion of first rectification column 26 as reflux. After essentially all of the carrier gas has been exhausted from the first rectification column through stream 33, another portion 38 of stream 35 is passed through valve 39 and recovered as product fluorine compounds comprising primarily high volatility fluorine compounds.

Following removal of most of the high volatility fluorine compounds from column 26 through stream 38, wash liquid comprising low volatility fluorine compounds is withdrawn from the lower portion of first rectification column 26 as stream 42 and passed through valve 43 into second batch storage tank 44 where it is stored for subsequent batch-wise processing. The use of tank 44 is advantageous when there is a significant variance in the fluorine compound concentration in the gaseous feed and/or in the gaseous feed flow rate. Any liquid that is vaporized within tank 44 may be passed out from tank 44 through valve 45 in line 46 and combined with first column feed stream 24 and then into first rectification column 26. Wash liquid comprising low volatility fluorine compounds is passed from tank 44 in stream 47 through valve 48 as second column feed into the lower portion of second rectification column 49 which is driven by external heat input through heat input line 50.

Within second rectification column 49 the second column feed is separated by cryogenic rectification into top vapor comprising low volatility fluorine compounds and residual wash liquid. Top vapor comprising low volatility fluorine compounds is withdrawn from the upper portion of second rectification column 49 as stream 51 and at least a portion thereof is recovered as product fluorine compounds. In the embodiment illustrated in FIG. 1, stream 51 is condensed by passage through heat exchanger 52 in indirect heat exchange with stream 14 which is then passed out of the system. Resulting stream 53 is withdrawn from heat exchanger 52 and a portion 54 is passed through valve 55 and into the upper portion of second rectification column 49 as reflux. Another portion 56 of stream 53 is recovered as product fluorine compounds. When more than one fluorine compound is to be recovered, each compound may be recovered sequentially.

Residual wash liquid is withdrawn from the lower portion of second rectification column 49 as stream 61 and passed through valve 62 into wash liquid storage tank 63. From tank 63 the residual wash liquid is passed as stream 64 through tank 16 wherein it is cooled by indirect heat exchange with the liquid within tank 16 to a temperature below 100° K. and preferably between 91° and 93° K. The resulting cooled wash liquid is passed from tank 16 into the upper portion of wash column 4 as stream 7.

Figure 2:
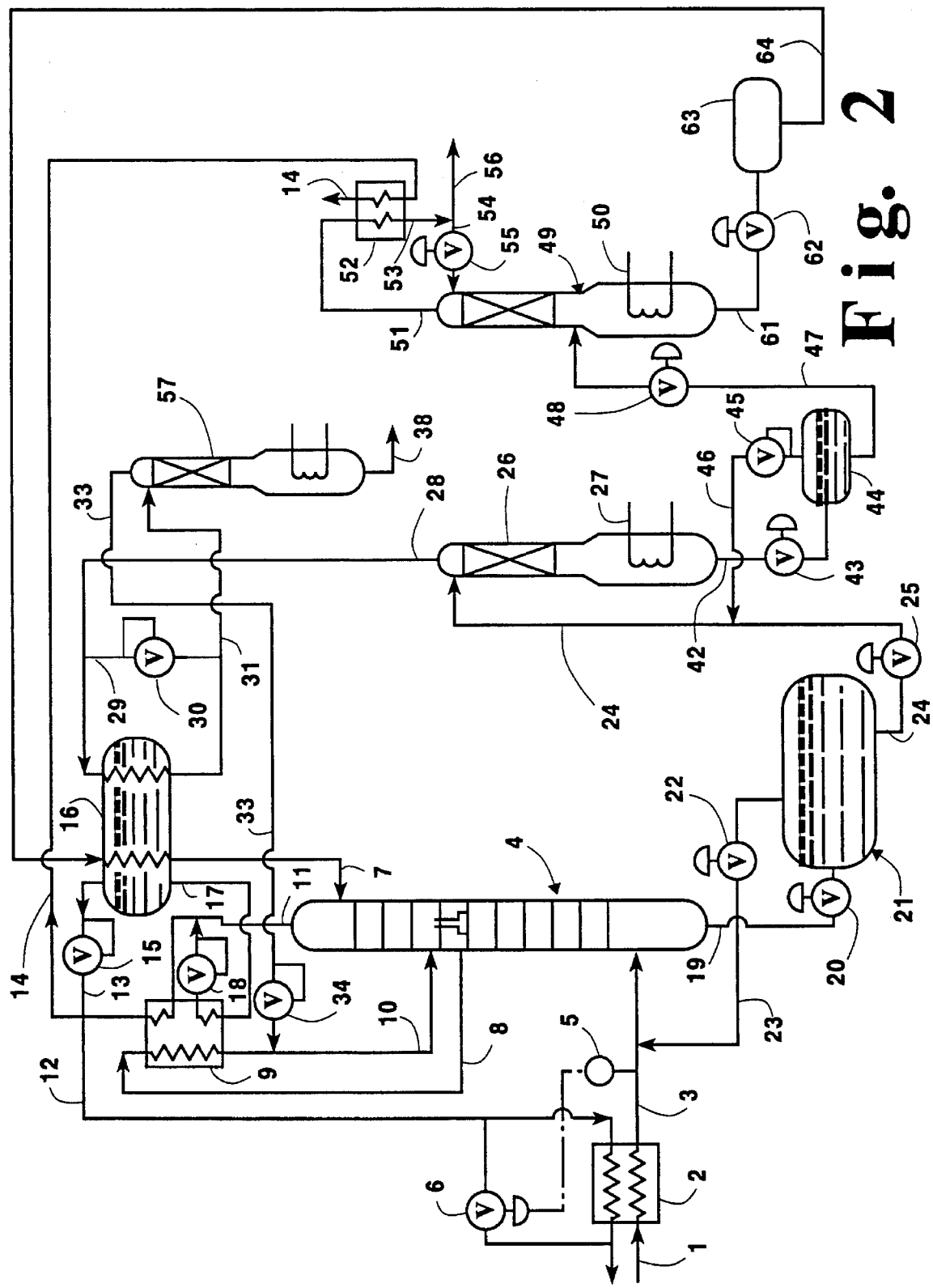
FIG. 2 is a schematic flow diagram of another embodiment of the fluorine compound recovery system of this invention wherein an additional rectification column is employed.

FIG. 2 illustrates another embodiment of the invention wherein the initial rectification steps are preferably carried out continuously. The numerals in FIG. 2 correspond to those of FIG. 1 for the common elements and these common elements will not be described again in detail. In the embodiment illustrated in FIG. 2, first rectification column feed 24 is passed into the upper portion of first rectification column 26. Stream 31 is passed into the upper portion of additional column 57 wherein it is separated by cryogenic rectification into carrier gas-containing vapor and into liquid containing high volatility fluorine compounds. The vapor is passed out from column 57 in stream 33, through valve 34 and combined with stream 10 and then passed into wash column 4. The liquid is withdrawn from column 57 and recovered as product fluorine compounds comprising primarily high volatility fluorine compounds.

Figure 3:
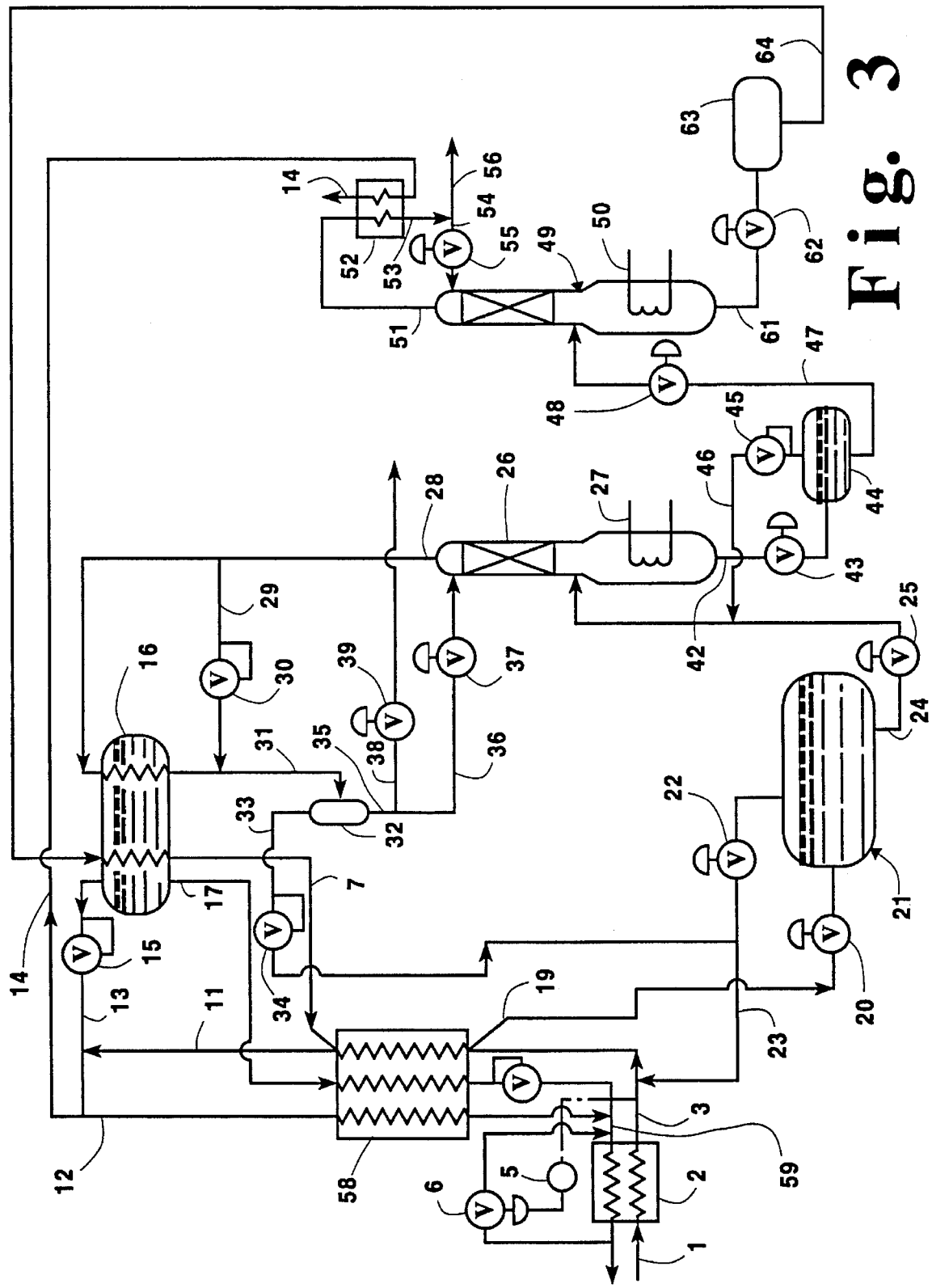
FIG. 3 is a schematic flow diagram of another embodiment of the fluorine compound recovery system of this invention wherein a dephlegmator is employed as the mass transfer contacting device.

FIG. 3 illustrates another embodiment of the invention wherein the mass transfer contacting device is a dephlegmator. The numerals in FIG. 3 correspond to those of FIG. 1 for the common elements. In the embodiment illustrated in FIG. 3, cooled gaseous feed 3 is passed into the lower portion of dephlegmator 58. Wash liquid 7 is passed into the upper portion of the same passages of dephlegmator 58. The gaseous feed flows up dephlegmator 58 and wash liquid flows down dephlegmator 58 and in the process high volatility fluorine compounds and low volatility fluorine compounds pass from the gaseous feed into the downflowing wash liquid to produce carrier gas-containing top vapor and wash liquid comprising high volatility and low volatility flourine compounds. The resulting vapor is withdrawn from dephlegmator 58 as stream 11, combined with stream 13 and further processed as described with the previous embodiments. Wash liquid comprising high volatility and low volatility fluorine compounds is withdrawn from the lower portion of dephlegmator 58 as stream 19 and further processed in a manner similar to that of the embodiment illustrated in FIG. 1. In the embodiment illustrated in FIG. 3, streams 12 and 17 each pass through dephlegmator 58 as heat exchange streams. The resulting warmed streams are combined to form stream 59 which is passed at least in part through heat exchanger 2 to carry out the cooling of gaseous feed 1 and is then passed out of the system. Also, stream 33 is passed into stream 23 which is then combined with the cooled gaseous feed 3 upstream of dephlegmator 58.

Figure 4:
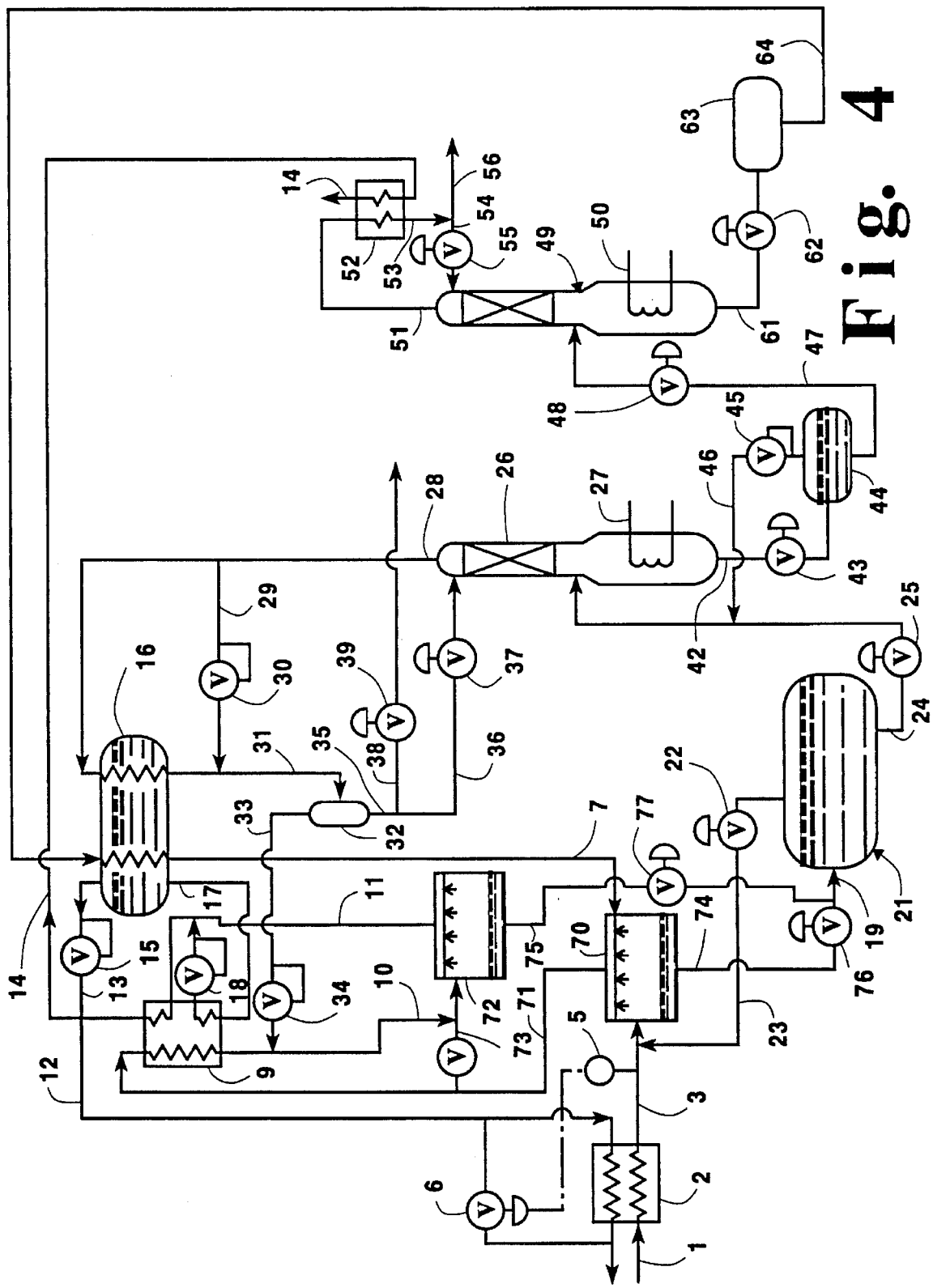
FIG. 4 is a schematic flow diagram of another embodiment of the fluorine compound recovery system of this invention wherein two spray chambers are employed as the mass transfer contacting device.

FIG. 4 illustrates another embodiment of the invention wherein the mass transfer contacting means is a spray chamber. The numerals in FIG. 4 correspond to those of FIG. 1 for the common elements. In the embodiment illustrated in FIG. 4, cooled gaseous feed 3 is passed into first spray chamber 70. Wash liquid 7 is also passed into first spray chamber 70 and the contact between the feed and the wash liquid produces a vapor enriched in carrier gas and a first liquid enriched in fluorine compounds. The vapor is withdrawn from first spray chamber 70 as stream 71. A portion is passed through heat exchanger 9 and combined with stream 33 to form stream 10 which is passed into second spray chamber 72. A portion 73 of stream 71 may be passed directly into second spray chamber 72. Wash liquid 7 is also passed into second spray chamber 72 wherein the resulting contact between the vapor and the liquid produces carrier gas-containing vapor and a second liquid enriched in fluorine compounds. The carrier gas-containing vapor is withdrawn from second spray chamber 72 as stream 11 and further processed similarly as described with the embodiment illustrated in FIG. 1. The first and second liquids are withdrawn respectively from first and second spray chambers 70 and 72 as streams 74 and 75, passed respectively through valves 76 and 77, and combined to form stream 19 which is further processed as previously described.

The embodiments of the invention illustrated in FIGS. 1–4 are preferred embodiments, in part, because they enable the separate recovery of high volatility fluorine compounds and low volatility fluorine compounds as the product fluorine compounds. When the incoming gaseous feed does not contain appreciable amounts of both high volatility and low volatility fluorine compounds, or when separate recovery of high volatility and low volatility fluorine compounds is not desired, the embodiment of the invention illustrated in FIG. 5 may be employed. The embodiment of the invention illustrated in FIG. 5 shows the invention employing a wash column although it will be recognized that the systems illustrated in FIGS. 2, 3 and 4 may also be employed with the embodiment illustrated in FIG. 5.

Figure 5:
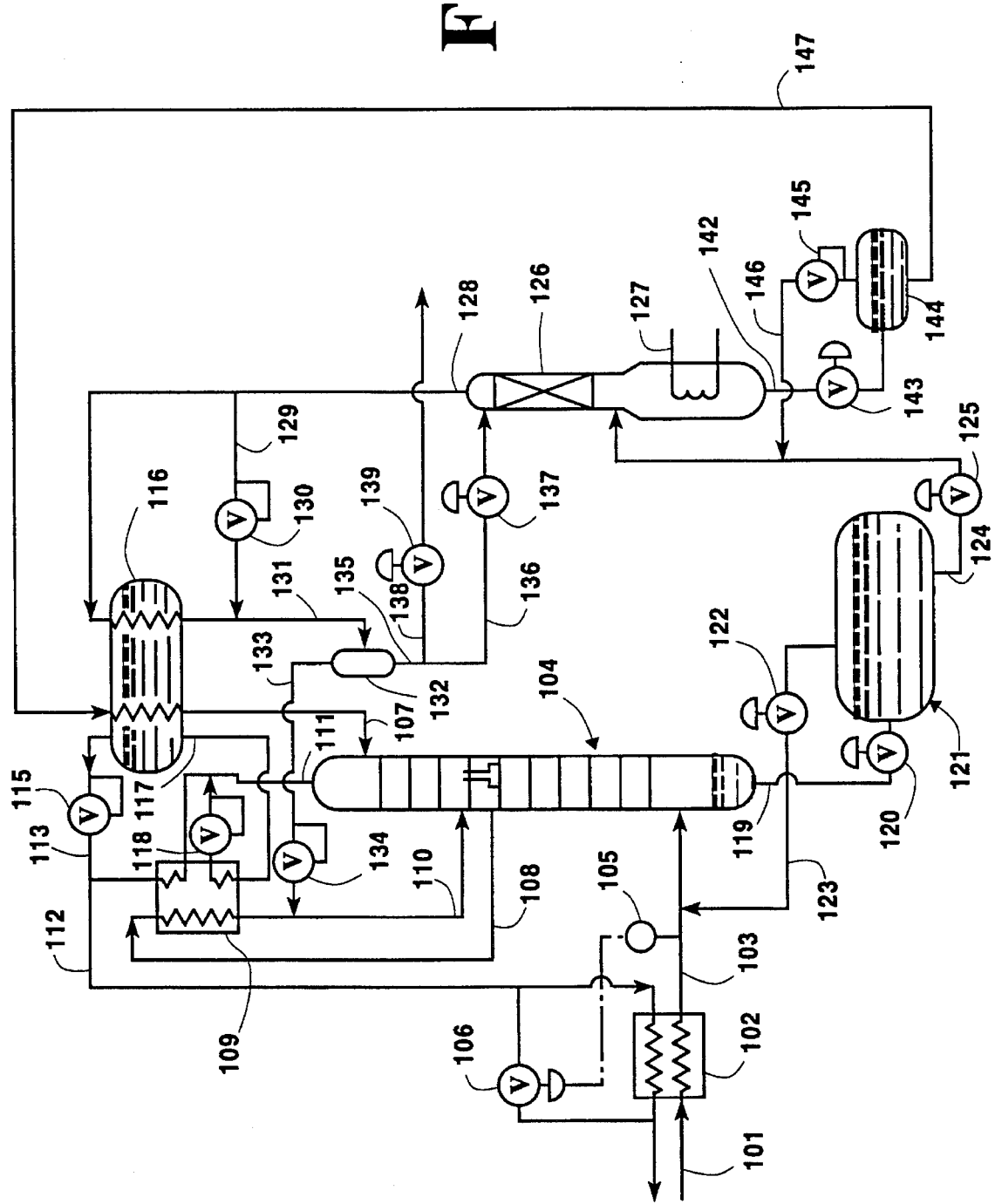
FIG. 5 is a schematic flow diagram of another embodiment of the fluorine compound recovery system of this invention.

Referring now to FIG. 5, gaseous feed 101 which has been pressurized to a pressure of at least 18 and preferably 20 psia and has been treated to remove particulate and chemically active impurities such as hydrogen fluoride, carbon dioxide and water, and which comprises nitrogen as the carrier gas and fluorine compounds, is cooled by indirect heat exchange in heat exchanger 102 with return nitrogen-containing top vapor taken from the wash column to a temperature somewhat above that at which some of the fluorine compounds would begin to condense, either as solid or liquid. Generally such temperature is within to range of from 150° to 130° K. The carrier gas of the gaseous feed may comprise other gases in addition to or in place of nitrogen such as oxygen, argon, helium and/or hydrogen.

Cooled gaseous feed 103 is then passed into the lower portion of wash column 104. Temperature controller 105 controls valve 106 to ensure that the temperature of gaseous feed 103 is within the desired range. Wash liquid 107 is passed into the upper portion of wash column 104. Wash liquid 107 has a freezing point lower than the temperature of the gaseous feed as it enters the mass transfer contacting device such as wash column 104 and has a vapor pressure at that temperature less than 1.0 mmHg and preferably less than 0.01 mmHg. A preferred wash liquid is perfluoropropane ($C_3F_8$). Other fluids which may be used as wash liquid 107 include propane, ethane and mixtures thereof.

The gaseous feed flows up wash column 107 and the wash liquid flows down wash column 107 and in the process fluorine compounds pass from the gaseous feed into the downflowing wash liquid to produce nitrogen-containing top vapor and fluorine compound-containing wash liquid. In the embodiment illustrated in FIG. 5 upflowing gas, which has been partially depleted of fluorine compounds, is withdrawn from wash column 107 as stream 108 and cooled by indirect heat exchange in heat exchanger 109. Resulting cooled stream 110, which may contain some liquid, is passed into wash column 107. The gas then continues up the wash column in countercurrent contact with the descending wash liquid to continue carrying out the aforesaid mass transfer of the fluorine compounds into the wash liquid.

The nitrogen-containing vapor is withdrawn from the upper portion of wash column 107 as stream 111. Liquid nitrogen stream 117 is withdrawn from tank 116, passed through part of heat exchanger 109, through valve 118 and then combined with stream 111. The resultant stream is then passed through a portion of heat exchanger 109, and then combined with nitrogen vapor stream 113 which is supplied from tank 116 through valve 115 to form stream 112. Stream 112 is passed, at least in part, through heat exchanger 102 to carry out the aforedescribed cooling of gaseous feed 101 and is then passed out of the system.

Fluorine compound-containing wash liquid is withdrawn from the lower portion of wash column 104 as stream 119 and preferably passed through valve 120 into batch storage tank 121 where it is stored for subsequent batch-wise processing. The use of tank 121 is advantageous when there is a significant variance in the fluorine compound concentration in the gaseous feed and/or in the gaseous feed flow rate. Any liquid that is vaporized within tank 121 may be passed out from tank 121 through valve 122 in line 123 and combined with gaseous feed stream 103 and then into wash column 104. Fluorine compound-containing wash liquid is passed from tank 121 in stream 124 through valve 125 as column feed into the lower portion of rectification column 126 which is driven by external heat input through heat input line 127.

Within rectification column 126 the column feed is separated by cryogenic rectification into fluorine compound-containing top vapor and bottom wash liquid.

The top vapor comprising fluorine compounds is withdrawn from the upper portion of rectification column 126 as stream 128 and at least a portion thereof is recovered as product fluorine compounds. In the embodiment illustrated in FIG. 5, stream 128 is passed through tank 116 in indirect heat exchange with the liquid such as liquid nitrogen within tank 116 and is partially condensed. A portion 129 of stream 128 may be passed through valve 130 so as to bypass tank 116. Resulting partially condensed stream 131 is then passed into phase separator 132. Vapor, comprised primarily of carrier gas, is passed out from phase separator 132 in stream 133, through valve 134 and combined with stream 110 and then into wash column 104. Liquid is withdrawn from phase separator 132 as stream 135. A portion 136 of stream 135 is passed through valve 37 and into the upper portion of rectification column 126 as reflux. After essentially all of the carrier gas has been exhausted from rectification column 126 through stream 128, another portion 138 of stream 135 is passed through valve 139 and recovered as product fluorine compounds.

Bottom wash liquid is withdrawn from the lower portion of rectification column 126 as stream 142 and passed through valve 143 into wash liquid storage tank 144. Any liquid that is vaporized within tank 144 may be passed out from tank 144 through valve 145 in line 146 and combined with column feed stream 124 and then into rectification column 126. From tank 144 the bottom wash liquid is passed as stream 147 through tank 116 wherein it is cooled by indirect heat exchange with the liquid within tank 116 to a temperature below 100° K. and preferably between 91° and 93° K. The resulting cooled wash liquid is passed from tank 116 into the upper portion of wash column 104 as stream 107.

Now by the use of the cryogenic fluorine compound recovery system of this invention one can effectively and efficiently recovery fluorine compounds from a carrier gas stream, such as an effluent stream from a semiconductor production facility, without generating significant amounts of waste gas or requiring significant further separation to produce fluorine compound products suitable for use. Furthermore, the invention enables one to effectively handle a feed gas stream which has a highly variable flow rate and/or fluorine compound concentration.

Although the invention has been described in detail with reference to certain embodiments, those skilled in the art will recognize that there are other embodiments of the invention within the spirit and the scope of the claims.

We claim:

1. A method for recovering fluorine compounds comprising:

(A) passing gaseous feed comprising carrier gas, high volatility fluorine compounds and low volatility fluorine compounds into a mass transfer contacting device, and passing wash liquid into the mass transfer contacting device;

(B) passing high volatility fluorine compounds and low volatility fluorine compounds into the wash liquid within the mass transfer contacting device to produce vapor comprising carrier gas and wash liquid comprising high volatility and low volatility fluorine compounds;

(C) passing the wash liquid comprising high volatility and low volatility fluorine compounds into a first rectification column as first column feed and separating the first column feed within said first rectification column by cryogenic rectification into top vapor comprising high volatility fluorine compounds and wash liquid comprising low volatility fluorine compounds;

(D) withdrawing top vapor comprising high volatility fluorine compounds from the first rectification column and recovering at least a portion thereof as product fluorine compounds;

(E) passing wash liquid comprising low volatility fluorine compounds into a second rectification column as second column feed and separating the second column feed within said second rectification column by cryogenic rectification into top vapor comprising low volatility fluorine compounds and residual wash liquid; and (F) withdrawing top vapor comprising low volatility fluorine compounds from the second rectification column and recovering at least a portion thereof as product fluorine compounds.

2. The method of claim 1 wherein the gaseous feed is cooled by indirect heat exchange with the vapor comprising carrier gas prior to being passed into the mass transfer contacting device.

3. The method of claim 1 wherein a portion of the top vapor comprising high volatility fluorine compounds withdrawn from the first rectification column is passed into the mass transfer contacting device.

4. The method of claim 1 wherein residual wash liquid is withdrawn from the second rectification column and passed into the mass transfer contacting device.

5. The method of claim 1 wherein the wash liquid has a freezing point lower than the temperature of the gaseous feed as it enters the mass transfer contacting device and has a vapor pressure at that temperature less than 1.0 mmHg.

6. Apparatus for the recovery of fluorine compounds comprising:

(A) a mass transfer contacting device and means for passing fluorine compound-containing feed into the mass transfer contacting device;

(B) means for passing wash liquid into the mass transfer contacting device;

(C) a first rectification column and means for passing liquid from the mass transfer contacting device into the first rectification column;

(D) means for recovering fluorine compounds taken from the upper portion of the first rectification column;

(E) a second rectification column and means for passing liquid from the lower portion of the first rectification column into the second rectification column; and (F) means for recovering fluorine compounds taken from the upper portion of the second rectification column.

7. The apparatus of claim 6 further comprising a heat exchanger and means for passing fluid from the upper portion of the mass transfer contacting device through the heat exchanger, wherein the means for passing fluorine compound-containing feed into the mass transfer contacting device also passes through said heat exchanger.

8. The apparatus of claim 6 further comprising means for passing fluid taken from the upper portion of the first rectification column into the mass transfer contacting device.

9. The apparatus of claim 6 wherein the means for passing liquid from the mass transfer contacting device into the first rectification column comprises a batch storage tank.

10. The apparatus of claim 6 wherein the means for passing liquid from the lower portion of the first rectification column into the second rectification column comprises a batch storage tank.

11. The apparatus of claim 6 further comprising means for passing liquid from the lower portion of the second rectification column into the mass transfer contacting device.

12. The apparatus of claim 6 wherein the mass transfer contacting device comprises a wash column.

13. The apparatus of claim 6 wherein the mass transfer contacting device comprises a dephlegmator.

14. The apparatus of claim 6 wherein the mass transfer contacting device comprises a spray chamber.

15. A method for recovering fluorine compounds comprising:

(A) passing gaseous feed comprising carrier gas and fluorine compounds into mass transfer contacting device, and passing wash liquid into the mass transfer contacting device;

(B) passing fluorine compounds into the wash liquid within the mass transfer contacting device to produce vapor comprising carrier gas and fluorine compound-containing wash liquid;

(C) passing the fluorine compound-containing wash liquid into a rectification column as column feed and separating the column feed within said rectification column by cryogenic rectification into fluorine compound-containing top vapor and bottom wash liquid; and (D) withdrawing fluorine compound-containing top vapor from the rectification column and recovering at least a portion thereof as product fluorine compounds.

16. The method of claim 15 wherein bottom wash liquid is withdrawn from the rectification column and passed into the mass transfer contacting device.

17. The method of claim 15 wherein the wash liquid has a freezing point lower than the temperature of the gaseous feed as it enters the mass transfer contacting device and has a vapor pressure at that temperature less than 1.0 mmHg.

18. Apparatus for the recovery of fluorine compounds comprising:

(A) a mass transfer contacting device and means for passing fluorine compound-containing feed into the mass transfer contacting device;

(B) means for passing wash liquid into the mass transfer contacting device;

(C) a rectification column and means for passing liquid from the mass transfer contacting device into the rectification column; and (D) means for recovering fluorine compounds taken from the upper portion of the rectification column.

19. The apparatus of claim 18 wherein the mass transfer contacting device comprises a wash column.

20. The apparatus of claim 18 wherein the mass transfer contacting device comprises a dephlegmator.

21. The apparatus of claim 18 wherein the mass transfer contacting device comprises a spray chamber.

22. The apparatus of claim 18 further comprising means for passing liquid from the lower portion of the rectification column into the mass transfer contacting device.

* * * * *